Figure 3:
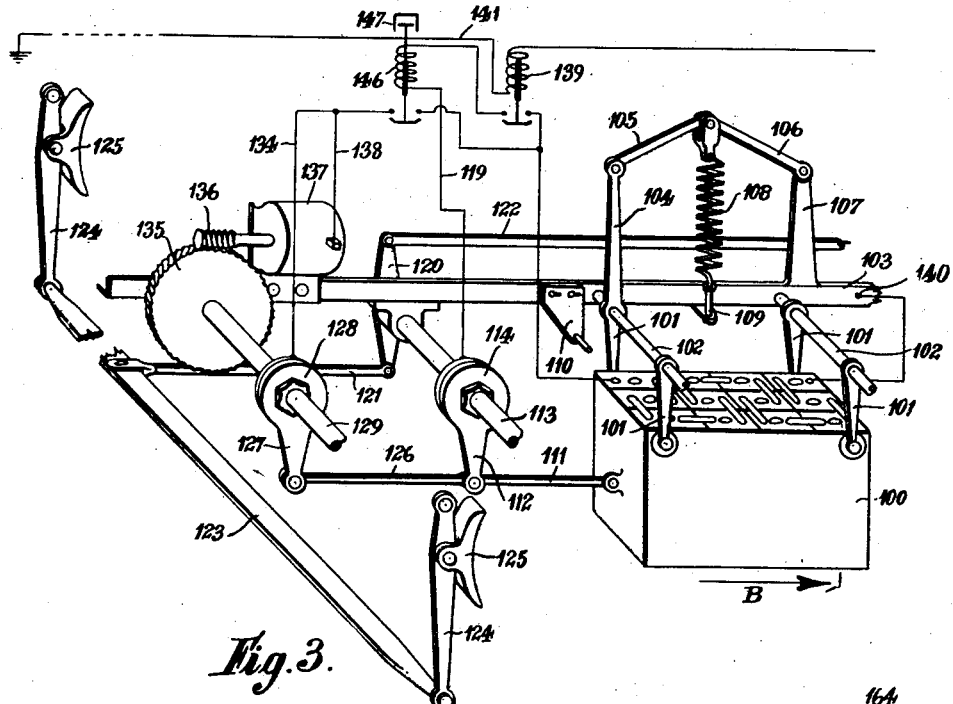

Dec. 12, 1939.  A. C. SAMPIETRO  2,183,283
CONTROL MEANS OF LAND VEHICLES
Filed March 8, 1938  2 Sheets-Sheet 1
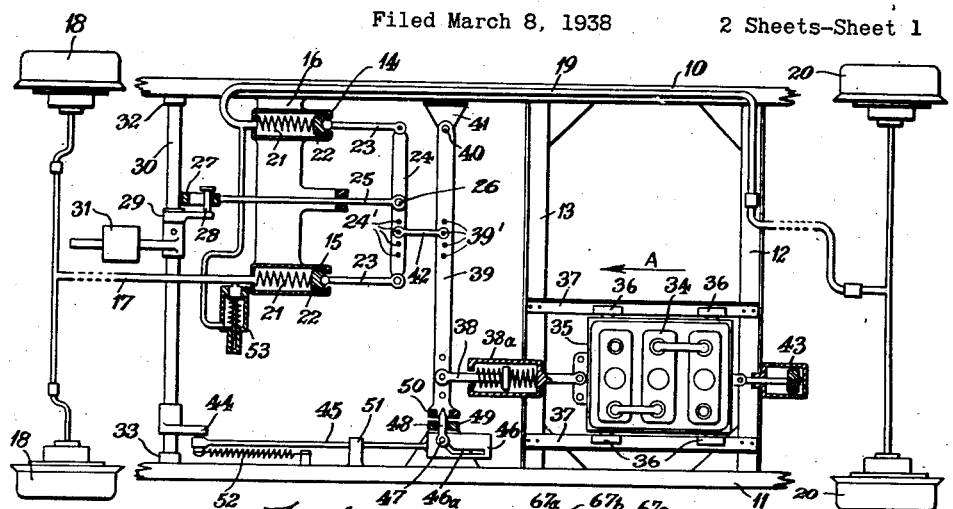
INVENTOR
A. C. Sampietro,
BY Carroll Bailey
ATTORNEY Dec. 12, 1939.  A. C. SAMPIETRO  2,183,283
CONTROL MEANS OF LAND VEHICLES
Filed March 8, 1938  2 Sheets-Sheet 2

INVENTOR
A. C. Sampietro,
BY Carroll Bailey
ATTORNEY

Patented Dec. 12, 1939

2,183,283

UNITED STATES PATENT OFFICE 2,183,283

CONTROL MEANS OF LAND VEHICLES

Achille Charles Sampietro, London, England

Application March 8, 1938, Serial No. 194,717
In Great Britain March 10, 1937

17 Claims. (Cl. 188—181)

On land vehicles and water- and air-borne vehicles it is sometimes desirable to provide a mass movable relative to the vehicle for the purpose of effecting, either directly, or through a servomotor, a controlling operation on the vehicle, under the influence of the inertia of the mass or of the force of gravity.

An object of this invention is to provide an improved controlling mechanism utilizing such a mass.

Such vehicles are often provided with electrical equipment which includes an accumulator battery forming a component part of the vehicle.

A further object of this invention is to provide mechanism wherein such an accumulator battery forms a mass utilized in the control of the vehicle. The selection of the accumulator battery for this purpose has substantial advantages, since the battery is relatively heavy, and its weight remains substantially constant at all times. To this end the battery is so mounted as to be displaceable relatively to the frame of the vehicle, and means serving for the control of the vehicle are operatively connected with the battery in such a manner that, on displacement of the battery in response to motion, or to change in the state of motion of the vehicle, the weight or the inertia of the battery can be employed to actuate said control means.

Another object is to provide improved braking mechanism for land vehicles wherein a mass is employed to afford a servo-braking effect; and in one form of the invention the accumulator battery forming part of the electrical equipment of the vehicle is so mounted as to be displaceable longitudinally of the frame of the vehicle, and an operative connection between the battery and the vehicle brakes serves to employ the inertia of the battery to apply the brakes in response to retardation of the vehicle.

When a road vehicle is braked, the load on the front wheels increases and the load on the rear wheels correspondingly decreases. The present invention can conveniently be employed to increase the ratio of front-wheel braking effect to rear-wheel braking effect as the retardation of the vehicle increases.

In applying this invention to the braking of vehicles, the proportion of the braking effort applied under the direct control of the driver to that applied by the inertia of the mass must be such that unstable braking conditions do not arise.

The invention may be employed for the servo-operation of the brakes of a trailer vehicle which is provided with an inertia mass, such as a battery, and which is adapted to be drawn by a vehicle having manually or foot controlled brakes. Braking mechanism especially applicable to such a trailer vehicle comprises a spring or equivalent resilient means adapted to effect preliminary brake application and a controllable servomotor, such for example as an electro-magnetic device, adapted to strain said spring or equivalent means and disengage the brakes.

The operative connection between the inertia mass and the brakes may include a controllable clutch which is disengaged to facilitate disengagement of the brakes.

Where the invention is employed to operate brakes on vehicles adapted to run normally in both directions, such as rail vehicles, the operative connection between the inertia mass and the brakes may be so arranged that displacement of the mass in either direction relative to the vehicle frame is adapted to apply the brakes.

Figure 8:
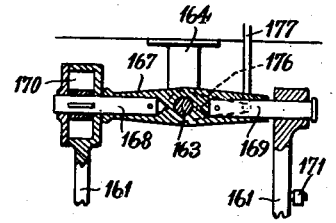
Figure 7:
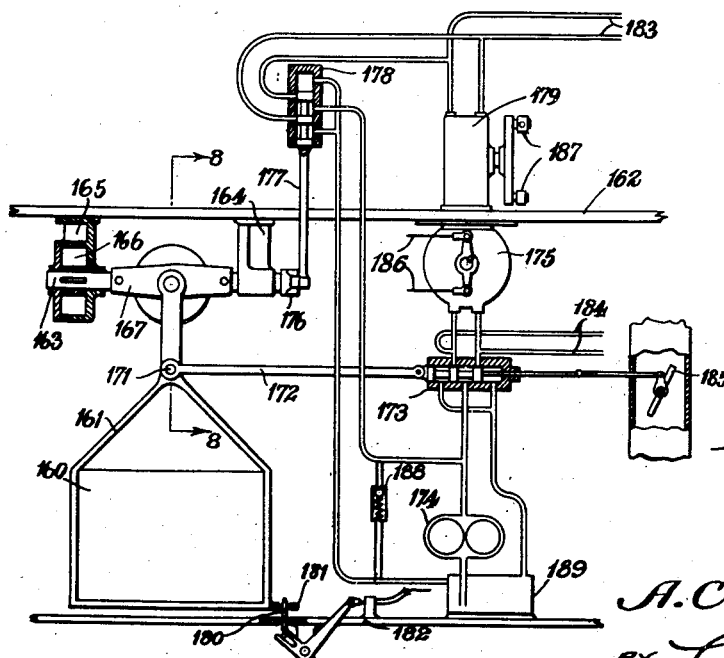

Other objects and advantages of the invention will be apparent from the following description with reference to the accompanying diagrammatic drawings, in which:

Fig. 1 is a plan view, partly in section, of part of the brake-actuating mechanism on an automobile, Fig. 2 is a side view of a braking arrangement for a railway vehicle, Fig. 3 is a view of part of the brake actuating mechanism of a trailer railway vehicle, Figs. 4 and 5 are sections of clutches shown in Fig. 3, Fig. 6 is an elevation of a brake control member of a locomotive for use with the vehicle of Fig. 3, Fig. 7 is a diagram of stabilizing mechanism on an aircraft, and Fig. 8 is a section of a detail on the line 8—8 in Fig. 7.

In Fig. 1 is shown part of the chassis frame of a four-wheeled road motor vehicle, including two longitudinal side members 10 and 11 and two transverse members 12 and 13. Two master brake cylinders 14 and 15 are fixed to the member 10 by a bracket 16. The cylinder 15 is connected by a duct 17 to hydraulically-operated front-wheel brakes 18, and the cylinder 14 is connected by a duct 19 to similar rear-wheel brakes 20. The plungers 22 of the brake cylinders are provided with return springs 21 and are coupled by push rods 23 to a floating beam 24. A pull rod 25, suitably guided in the bracket 16, is pivotally connected to this beam at 26.

An eye 27 on the front end of the rod 25 is engaged with a pin 28 on a crank arm 29 fixed to a brake control member in the form of a pedal 31 and to a brake shaft 30 journalled in the frame at 32 and 33.

An inertia mass, which is conveniently the starting and lighting battery 34 of the vehicle, is mounted in a carriage 35 which is displaceable longitudinally of the vehicle, being carried on rollers 36 running on rails 37 fixed to the frame members 12 and 13. The carriage 35 is pivotally connected by a link 38 to a transverse lever 39 pivoted about a vertical pin 40 carried by a bracket 41 fixed to the frame member 10. A link 42, connects the lever 39 to the floating beam 24, being coupled to the latter at a point between the connection of the pedal pull rod 25 and the push rod 23 of the front brake cylinder 15. The floating beam 24, or the transverse lever 39 or both may be provided with alternative pivotal points 24', 39', respectively, distributed along their length, for the attachment of the link 42. A shock-absorbing spring device 38a may be included in the link 38. A damping device, such as a hydraulic dash-pot 43, may be provided to check rebound of the battery.

Means may be provided for preventing the battery from moving unless pressure is exerted on the brake pedal. Thus the eye 27 of the pull rod 25 is elongated so as to provide lost motion between the crank 29 and this rod. A crank arm 44 is fixed to the brake cross shaft 30 and a tension spring 52 urges the crank 44 in such a direction as to raise the pedal 31. A rod 45 is pivotally connected to the crank 44 and guided in a fixed bracket 51. A cam plate 46 fixed to the rod 45 has a cam slot 46a in which engages a pin 47 fixed to a locking bolt 48 slidable in a bracket 49 fixed to the frame member 11. The bolt 48 is normally engaged with an eye 50 on the lever 39.

Initial depression of the brake pedal 31 rocks the cross shaft 30 far enough to cause the locking bolt 48 to be withdrawn from engagement with the lever 39, so that the battery is free to move. At the same time the lost motion at the eye 27 is taken up. Further depression of the pedal causes the pull rod 25 to move forward and to effect preliminary application of the brakes in the usual manner, the initial distribution of the braking effort between the front and back wheels being determined by the position of the pivot 26 on the beam 24. However, immediately the brakes act to retard the vehicle, the battery, owing to its inertia, tends to move in the direction of the arrow A relatively to the frame. It thus imposes on the floating beam 24 an additional actuating force and increases the proportion of the total actuating force that is applied to the front brake cylinder 15. When the brake pedal 31 is released, the springs 21 cause the plungers 22 to move rearwards, returning the battery to the position shown. As the lever 39 approaches the normal position, the spring 52 causes the locking bolt to be urged inwards by the cam plate 46, and as soon as the eye 50 registers with this bolt the latter is projected home, locking the battery against further movement.

The brake cylinders may be connected by a spring-loaded by-pass valve 53 arranged to open automatically and bring the braking efforts on the front and back wheels to a predetermined ratio if the effort on the front wheels should rise to a dangerous value owing to accidental circumstances.

In the braking arrangement shown in Fig. 2, which is applicable to the braking of a railcar, the inertia mass provides a servo effect in both directions of travel of the vehicle. The primary brake shoes 60 are urged into the "on" position by springs 61 compressed respectively between the ends of a solenoid 64 and collars 62 fixed to solenoid plungers 63 which form the push rods for applying the shoes 60. The solenoid is provided with a plurality of windings. One end of each winding is connected to a common earth point 65 and the other ends are connected, by a multi-core cable 66, respectively, to a plurality of arcuate contact strips 67a, 67b, etc., of a controller 69.

The inertia mass, which is here the battery 70 of the electrical equipment of the railcar, is movable longitudinally of the vehicle on rollers 71 and is connected by a rod 72 to the plunger 73 of a solenoid 74 adapted, when energized, to urge the battery towards, and to maintain it in the neutral position shown. One end of the windings is earthed at 75, and the other end is connected by a conductor 76 to a contact stud 77 of the controller 69, which includes a conducting arm 78 connected by a conductor 79 with one terminal of the battery 70. The other terminal of the battery is earthed at 80.

A lever 81 is pivoted at 82 to a fixed bracket 83, and pins 84 and 85, fixed to the lever 81, engage respectively in elongated eyes 86 and 87 in links 88 and 89 coupled to the battery 70. The upper end of the lever 81 is coupled by a link 90 to brake-hanger levers 91 actuating shoes 92, and the lower end of the lever 81 is coupled by a link 93 to brake-hanger levers 94 actuating shoes 95.

When the controller arm 78 is in the position shown, it is in contact with the stud 77 so that the solenoid 74 is energized and the battery is held in the neutral position. The arm 78 is also in contact with all the strips 67a, 67b, etc., so that the solenoid 64 is fully energized. In this condition the solenoid 64 overcomes the force of the springs 61 and holds the brake shoes 60 "off." If now the controller arm 78 is moved progressively clockwise while the vehicle is running, first it leaves the stud 77 so that the solenoid 74 is de-energized. It then leaves the contact strip 67a, and the excitation of the solenoid 64 is weakened sufficiently to allow the springs to effect preliminary brake application by applying the brake shoes 60. The vehicle is consequently retarded, and the inertia of the battery causes the link 88 to pull on the pin 84 if the vehicle is running from left to right, or the link 89 to push the pin 85 if the vehicle is running the opposite way. In either case the lever 81 is urged clockwise and effects servo brake application by applying the brake shoes 92 and 95. As the controller arm 78 is moved further clockwise, the excitation of the solenoid 64 is progressively weakened and the braking effect is correspondingly increased. When the arm 78 is returned to the position shown, the solenoid 64 disengages the brake shoes 60, and the solenoid 74 returns the battery to the neutral position and disengages the brake shoes 92 and 95.

Figs. 3 to 6 show an application of the invention to a trailer coach of a train of vehicles. In Fig. 3 the inertia mass, which here also is conveniently the lighting battery 100 of the trailer coach, is suspended by parallel links 101 from transverse pins 102 fixed to the coach under frame, a part of which is shown at 103. One of the links 101 has an upwardly-extending arm 104 to the upper end of which is connected a toggle lever 105. The lever 105 co-operates with a toggle lever 106 pivoted to a bracket 107 fixed to the frame member 103. A strong tension spring 108 is coupled between a lug 109 on the frame member 103 and the pivotal connection between the toggle levers 105 and 106, so as to urge the battery 100 to move in the direction of the arrow B relatively to the frame. An adjustable stop 110 limits the movement of the battery in the opposite direction.

The battery is coupled by a link 111 to a lever 112 adapted to be connected by an electro-magnetically-actuated friction clutch 114 to a cross shaft 113. The clutch 114 (Fig. 4) has an electro-magnet 115 keyed to the shaft 113 and a conical driven element 116 keyed to the boss 115a of the electro-magnet. The lever 112 is fixed to a conical driving element 117 of magnetic material, which is urged by a spring 118 into frictional engagement with the member 116. One end of the exciting winding of the electro-magnet 115 is earthed, and the other end is connected to a conductor 119. A two-armed lever 120 is keyed to the shaft 113 and pivotally connected to pull rods 121 and 122 leading respectively to the rear brake beam 123, and to the front brake beam (not shown). The rear brake hangers and shoes are denoted respectively by 124 and 125.

The battery is further coupled by a link 126 to a lever 127 adapted to be connected by an electro-magnetically-actuated friction clutch 128 to a cross shaft 129. The clutch 128 (Fig. 5) has a conical electro-magnet 130 keyed to the shaft 129 and a conical driving element 131 of magnetic material to which the lever 127 is fixed and which is urged by a spring 132 out of friction engagement with the electro-magnet 130 and against an abutment 133. One end of the exciting winding of the electro-magnet 130 is earthed, and the other end is connected to a conductor 134. A worm wheel 135 is keyed to the shaft 129 and engages a worm 136 on the shaft of an electric motor 137 which is capable of remaining continuously stalled under load without overheating. One end of the motor windings is earthed, and the other end is connected to a conductor 138. The conductor 119 is connected through the exciting winding of a contactor 146 and the contacts of a contactor 139 to one terminal of the battery 100 the other terminal of which is earthed at 140. The conductors 134 and 138 are connected through the contacts of the contactor 146 to the first-mentioned terminal of the battery. The contactor 146 is provided with a dash-pot 147 which causes it to open with a delayed action. The contactor 139 forms the control member of the trailer brakes, and its energizing winding is connected in series in a train brake conductor 141 of an earth-return circuit including a brake controller on the locomotive. In this example this controller (Fig. 6) is a pedal 142 provided with a pair of insulated normally-closed contacts 143 connected respectively to the conductor 141 and through a battery 144 to earth. One of the contacts 143 is mounted on a pivoted sole plate 145 so arranged that when the pedal is depressed the contacts open.

This system operates as follows. The vehicle is assumed to be running in the direction of the arrow B in Fig. 3. When the brakes are "off," the train brake circuit is energized, since the contacts 143 (Fig. 6) are closed, and the contactor 139 (Fig. 3) is therefore kept closed. The clutch 114 is energized and kept disengaged, and the current flowing in the conductor 119 keeps the contactor 146 closed, so that the clutch 128 is energized and kept engaged and the motor 137 exerts a clockwise torque on the shaft 129. The battery 100 is consequently held against the stop 110. When the locomotive brake pedal 142 is depressed to apply the locomotive brakes, the contacts 143 open and de-energize the conductor 141, opening the contactor 139, which causes the clutch 114 to engage and thereafter the contactor 146 to open, de-energizing the motor 137 and the clutch 128. Since the clutch 128 is now disengaged, the battery 100 is moved to the right by the spring toggle linkage 104, 105, 106, 108. The shaft 113 is therefore urged anti-clockwise and the preliminary application of the trailer vehicle brakes is effected through the lever 120. As soon as the vehicle undergoes retardation, the brakes become fully applied under the joint influence of the spring 108 and the inertia of the battery 100.

When the driver's brake pedal is released, the contactor 139 is re-energized, disengaging the clutch 114 and releasing the trailer vehicle brakes. The contactor 146 is energized in turn, engaging the clutch 128 and starting the motor 137, which returns the battery 100 into contact with the stop 110 and tensions the spring 108.

The exciting windings of the clutches 114 and 128 may be shunted by condensers 148 which assist in demagnetizing the electro-magnets when the clutches are de-energized and thus avoid risk of drag.

The train brake conductor 141 may include a switch 149 adapted to be opened by a trip lever 150 co-operating with a controlled tripping member on the track.

Figs. 7 and 8 show an arrangement for automatically maintaining an aeroplane level in flight.

The aircraft's battery 160 is carried in a cradle 161 suspended from a frame member 162 by a Hooke's joint. A longitudinal shaft 163 is journalled in two brackets 164 and 165 fixed to the member 162. The bracket 165 includes a hydraulic damper 166. To the shaft 163 is fixed a star piece 167 in which are fixed two co-axial transverse stub shafts 168 and 169 supporting the cradle 161. A hydraulic damper 170 checks relative movement of the cradle 161 to the star piece 167. A pin 171 on the cradle is coupled by a link 172 to a reversing piston valve 173 of known type which controls the supply of liquid from a power-driven pump 174 to a reversible hydraulic servo-motor 175 controlling the elevators of the aircraft through elevator cables 186.

A horizontal crank arm 176 is fixed to the longitudinal shaft 163 and is coupled by a link 177 to a reversing piston valve 178 which controls the supply of liquid from the pump 174 to a reversible hydraulic servo-motor 179 controlling the ailerons, the aileron cable sockets being designated as 187. The pump is provided with a spring loaded by-pass valve 188 which returns the liquid to the reservoir 189 when both of the valves 173 and 178 are closed.

A controllable locking bolt 180, slidable in a frame member 182 can be engaged in an eye 181 on the battery cradle 161 to lock the battery in the neutral position, in which both piston valves are closed. In this condition banking and elevation are controlled by a manual hydraulic control (not shown) connected to branch ducts 183 and 184. The actuating member of the piston valve 173 that controls the elevators may be connected to the power control member of the aircraft engines so as to reduce the power output when the machine begins to dive and to increase it when the machine begins to climb, so as to minimize longitudinal accelerations. In the example shown the power control member is an auxiliary throttle valve 185 in the engine induction system.

I claim:

1. A vehicle comprising a frame, an accumulator battery forming part of the electrical equipment of said vehicle and displaceable relative to said frame, means operable for varying the state of motion of said vehicle, an operative connection between said battery and said means whereby displacement of said battery relative to said frame assists in varying the state of motion of the vehicle, and an operator's control member normally restraining displacement of said battery relative to said fame and operable to permit displacement thereof relative to the frame.

2. A vehicle comprising a frame, an accumulator battery forming part of the electrical equipment of said vehicle and displaceable longitudinally of said frame, control means for varying the speed of said vehicle, an operative connection between said battery and said control means, whereby displacement of said battery relative to said frame assists in varying the speed of the vehicle, and an operator's control member normally restraining displacement of the battery relative to the frame and operable to permit displacement thereof relative to the frame.

3. A land vehicle comprising a frame, vehicle brakes, an accumulator battery forming part of the electrical equipment of said vehicle and so mounted as to be displaceable longitudinally of said frame, an operative connection between said battery and said vehicle brakes, which serves to employ the inertia of the battery to apply the brakes in response to retardation of the vehicle, and an operator's control member normally restraining displacement of the battery relative to the frame and operable to permit displacement thereof relative to the frame.

4. In a land vehicle comprising a frame, front-wheel brakes, rear-wheel brakes, a brake control member having brake applied and brake released positions, an inertia mass so mounted as to be displaceable longitudinally of said frame, an operative connection between said inertia mass and said front- and rear-wheel brakes, which serves to employ the inertia of said mass to increase the ratio of front-wheel braking effect to rear-wheel braking effect responsive to retardation of the vehicle, and means actuated by said brake control member upon movement thereof to its brake released position to restrain displacement of said inertia mass relative to the frame, thereby to prevent inopportune application of the brakes by said inertia mass.

5. In a land vehicle comprising a frame, front-wheel brakes, rear-wheel brakes, a brake applying member having brake applied and brake released positions, an accumulator battery forming part of the electrical equipment thereof and so mounted as to be displaceable longitudinally of said frame, an operative connection between said battery and said front- and rear-wheel brakes, which serves to employ the inertia of said battery to increase the ratio of front-wheel braking effect to rear-wheel braking effect responsive to retardation of the vehicle, and means actuated by said brake control member upon movement thereof to its brake released position to restrain displacement of said battery relative to said frame, thereby to prevent inopportune application of the brakes by said battery.

6. A land vehicle comprising a frame, front-wheel brakes having an actuating member, rear-wheel brakes having an actuating member, a driver's control member, a floating member connecting said driver's control member to both of said actuating members and determining the ratio of front-wheel to rear-wheel braking effect on initial brake application by said driver's control member, an accumulator battery forming part of the electrical equipment of the vehicle and so mounted as to be displaceable longitudinally of said frame, and an operative connection between said battery and a point on said floating member so selected that the inertia of said battery, as the retardation of said vehicle increases, operates through said connection on said floating member to increase said ratio.

7. A land vehicle comprising a frame, vehicle brakes, a brake control member operable for effecting preliminary brake application, an inertia mass displaceable longitudinally of said frame and operatively connected with at least some of said brakes for effecting servo brake application in response to retardation of said vehicle, and means which are operable for holding said inertia mass in a neutral position and which are disengaged responsive to initial displacement of said brake control member in the brake-applying direction.

8. A land vehicle comprising a frame, vehicle brakes, a brake control member operable for effecting preliminary brake application, an inertia mass displaceable longitudinally of said frame, means for connecting at least some of said brakes to said mass and employing the inertia of said mass, on retardation of said vehicle, to effect servo brake application, a servo-motor for urging said mass towards its neutral position and control means for said servo-motor, actuated by said brake control member.

9. A land vehicle comprising a frame, vehicle brakes, a brake control member operable for effecting preliminary brake application, an accumulator battery forming part of the electrical equipment of said vehicle and so mounted therein as to be displaceable longitudinally of said frame, an operative connection between said battery and at least some of said brakes whereby displacement of said battery upon retardation of said vehicle effects servo brake application, a servo-motor mechanically connected with said battery, and a controller for said servo-motor, which is so actuated by said brake control member as to restore said battery to a neutral position when said control member is actuated to release said brakes.

10. A land vehicle comprising a frame, vehicle brakes, an inertia mass so mounted as to be capable of displacement longitudinally of said frame, an operative connection between said mass and at least some of said brakes, resilient means capable of applying at least some of said brakes, a servo-motor capable of opposing said resilient means and thereby releasing said last-mentioned brakes, and a brake control member for actuating said servo-motor.

11. A land vehicle comprising a frame, a vehicle brake, means including a disengageable clutch for applying said brake, an inertia mass operatively connected to said means and displaceable longitudinally of said frame, said inertia mass serving to apply said brake under the influence of retardation of said vehicle, and control means operable for disengaging said clutch and thereby releasing said brake.

12. A land vehicle comprising a frame, a vehicle brake, means including a disengageable clutch for actuating said brake, elastic biasing means operatively connected to said brake-actuating means and capable of effecting initial brake application, an inertia mass displaceable longitudinally of said frame and operatively connected to said brake-actuating means for effecting servo brake application under the influence of retardation of said vehicle, a servo-motor operatively associated with said biasing means, and a common control member for said clutch and said servo-motor, which, when operated in one sense disengages said clutch to release said brake and causes said servo-motor to strain said biasing means and thereby restore said inertia mass to a neutral position.

13. A land vehicle comprising a frame, a vehicle brake, means including a disengageable clutch for actuating said brake, an inertia mass displaceable longitudinally of said frame and operatively connected with said brake-actuating means for effecting servo brake application under the influence of retardation of said vehicle, a servo-motor connected to said inertia mass, and an interlocked control mechanism for said clutch and said servo-motor which when actuated in one sense first disengages said clutch and thereafter causes said servo-motor to restore said inertia mass to a neutral position.

14. In a train of vehicles, a vehicle comprising a frame, a vehicle brake, means including a disengageable clutch for actuating said brake, an accumulator battery forming part of the electrical equipment of said vehicle and displaceable longitudinally of said frame, said battery being operatively connected with said brake-actuating means for effecting servo brake application under the influence of retardation of said train, and a relay which is operable for disengaging said clutch to release said brake and which is arranged to be remote controlled from another vehicle included in said train.

15. A land vehicle adapted to run normally in both directions and comprising a frame, an inertia mass displaceable longitudinally of said frame, a brake, an operative connection between said inertia mass and said brake for effecting servo brake application under the influence of retardation of said vehicle in both directions, and a brake control member normally restraining displacement of said inertia mass during acceleration of said vehicle in both directions and operable by actuation to apply the brake to release said mass to permit same to effect servo brake application.

16. A land vehicle comprising a frame, vehicle brakes, a brake control member, an accumulator battery forming part of the electrical equipment of said vehicle and displaceable longitudinally of said frame, and brake-actuating gear which includes an operative connection to said brake control member for effecting an initial variable braking effect, said brake-actuating gear also including an operative connection to said battery for effecting a servo braking effect the magnitude of which is determined by the degree of energizing of said first-mentioned connection.

17. A vehicle comprising an accumulator battery which forms part of the electrical equipment thereof and which is so mounted as to be capable of displacement longitudinally in the frame of the vehicle in response to change of velocity of the vehicle in the vertical plane containing the longitudinal axis thereof, means including an operator's control member for the control of such velocity, an operative connection between said battery and said control means for influencing said velocity in response to displacement of said battery caused by a change in said velocity, and means including said operator's control member for effectively restraining movement of said battery at will.

ACHILLE CHARLES SAMPIETRO.